Nov. 4, 1930.  H. P. PULLWITT  1,780,600
ELECTROTHERAPEUTIC MACHINE
Filed Sept. 26, 1928  6 Sheets-Sheet 1

INVENTOR.
HERMAN P. PULLWITT
BY Albert C. Bell
ATTORNEY Patented Nov. 4, 1930

1,780,600

UNITED STATES PATENT OFFICE

HERMAN P. PULLWITT, OF OAK PARK, ILLINOIS, ASSIGNOR TO McINTOSH ELECTRICAL CORPORATION, OF CHICAGO, ILLINOIS, A CORPORATION OF DELAWARE

ELECTROTHERAPEUTIC MACHINE

Application filed September 26, 1928. Serial No. 308,424.

My invention relates to an improvement in electro-therapeutic machines of the class producing high frequency currents of different kinds or modalities, for application in cases generally within the classification of diathermia. In such cases the heating effect of the current of one voltage or another is desired, depending upon the nature of the case, instead of the contractile effect upon the musculature resulting from alternating current of low frequency, from slow sinusoidal current, or galvanic current.

In generating high frequency currents for the purpose contemplated, it is important that there be a means for changing within certain limits, the frequency of the current delivered to the patient's circuit for example from 750 kilocycles to 2200 kilocycles, and it is desirable that the devices employed for changing the frequency of the delivered current, co-operate with means affording a definite indication to the operator of the particular frequency being delivered for any particular setting of the apparatus, and that the apparatus may be set exactly for desired frequencies, since in some cases of treatment very high frequencies are indicated, in other cases much lower frequencies are indicated and in still other cases it is desirable that the frequency applied to the patient shall be an intermediate frequency, although all of these frequencies are of the class known as high frequency currents. In some apparatus of this kind produced in the past, means have been employed for changing the frequency of the current which have been objectionable because of affording changes only by relatively large amounts resulting in coarse steps in the regulation. By my invention, I not only provide devices by which the high frequency may be changed conveniently from one value to another within the range of the apparatus, as well as indicating devices definitely indicating the particular frequency delivered by the apparatus for any particular setting of the frequency changing devices, but I also provide that the change in frequency may be gradual and continuous throughout the entire range of frequencies of the apparatus, thus facilitating an exact setting of the apparatus throughout its entire range of frequencies, for any particular high frequency desired.

In producing high frequency currents for the purpose desired, the apparatus employed includes a means for regulating the voltage of the alternating current applied to the apparatus, a step-up transformer for increasing the voltage of the applied alternating current to a much higher voltage, a spark gap or gaps, a condenser or condensers, and an inductance or inductances, co-operating to determine the frequency of the current flow set up in an oscillatory circuit and delivered to the patient's circuit. In carrying out my invention I make use of a novel type of inductance coil provided with means for varying the inductance of the coil by minute amounts from zero to the maximum inductance of the coil, in such a manner that the variation in inductance is continuous and smooth throughout the entire range of variation from zero to the maximum inductance of the coil, and I also provide a novel form of spark gap construction co-operating with the variable inductance and with the other parts of the apparatus to secure the results above described.

By my invention I also provide means for delivering to the patient's circuit different modalities of the high frequency current, for example relatively low voltage, high frequency current by the inductance coil, for example a d'Arsonval coil, high frequency currents of intermediate voltage, for example by means of a Tesla transformer, and high frequency currents of very high voltage, for example by means of an Oudin resonator.

My invention will best be understood by reference to the accompanying drawings showing a preferred embodiment thereof in which.

Similar numerals refer to similar parts throughout the several views.

Figure 1:
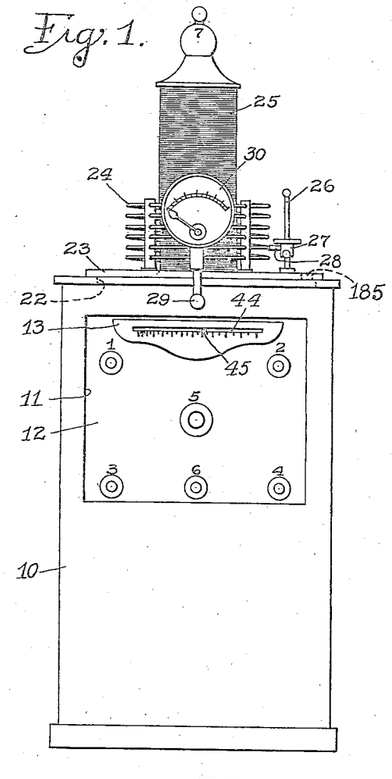
Fig. 1 shows my machine in front elevation.
Figure 2:
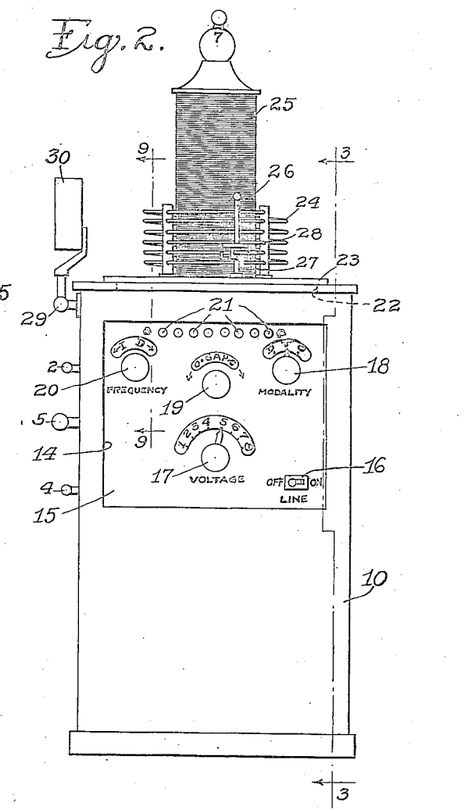
Fig. 2 shows my machine in side elevation.

As shown in Figs. 1 and 2 my machine consists of a cabinet 10 having an aperture 11 in its front wall and supporting a first panel 12 of insulating material, which panel in turn supports the several binding posts 1, 2, 3, 4, 5 and 6 of the patient's circuit, and the indicating scale 13 of the frequency changing devices.

One side wall of the machine, for example the right hand side wall as illustrated in Fig. 2, is provided with an aperture 14 which is closed by a second insulating panel 15 carrying a line switch 16, a first knob 17 for changing as desired, the voltage of the alternating current delivered to the high frequency producing devices, a second knob 18 for selecting a desired modality or voltage of high frequency current to be delivered to the patient's circuit, a third knob 19 for changing the adjustment of the spark gap as a whole, as desired, and a fourth knob 20 for varying the frequency as desired. In addition to the knobs described, the panel 15 also carries a plurality of smaller knobs 21 for individually adjusting as desired, the several electrodes of the spark gap.

The top of the cabinet is provided with an aperture 22 closed by a third panel 23 of insulating material, which besides supporting below it, the current controlling devices in a manner to be described, carries above it, the primary winding 24 and the secondary winding 25 of a high voltage Oudin resonator. The mounting of the secondary winding 25 carries at its upper end a post or electric connection 7 to constitute a part of the patient's circuit when the Oudin resonator is used. The panel 23 also supports a metal post 26 carrying an adjustable sleeve 27, which sleeve in turn carries a contact spring 28 for engaging a desired turn of the primary winding 24 so that by moving the sleeve 27 vertically on the post 26 the amount of the primary winding 24 included in the circuit may be changed by any desired number of complete turns of the primary winding 24.

The front of the cabinet 10 carries a bracket 29 which in turn supports a current measuring device 30, for example a milliammeter responsive to high frequency alternating current flow, for indicating the amount of current flowing in the patient's circuit.

Figure 3:
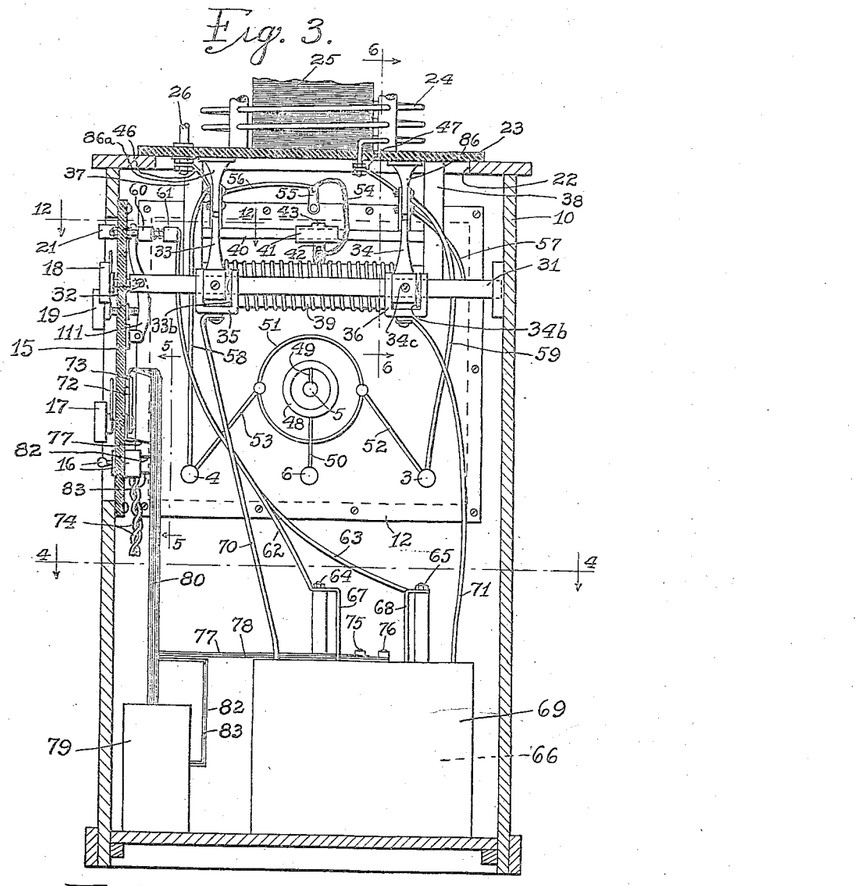
Fig. 3 is a sectional view to an enlarged scale of the parts shown in Fig. 2 taken along the line 3—3.

As shown in Fig. 3, a shaft 31 of insulating material, for example a phenol condensation product, is supported in horizontal position by the panel 15 and the opposite wall of the cabinet 10, in line with the modality selecting knob 18, from which an operating rod extends through the panel 15 into the shaft 31 to which it is rigidly secured by a set screw 32. The shaft 31 has rigidly secured thereto, switch blades 33 and 34 to selectively engage switch contacts carried by the panel 23 in a manner to be described. The shaft 31 also carries around the ends of the blades 33 and 34, metal yokes 35 and 36 which are rotary relatively to the shaft 31 and held in contact with the blades 33 and 34 respectively by flat springs 33ᵇ and 34ᵇ as indicated.

Between the shaft 31 and the panel 12, posts 37 and 38 are rigidly secured to the panel 23 and extend downwardly therefrom to form the end bearing supports of the inductance coil 39 which is supported by said posts 37 and 38 in line with the knob 20. The posts 37 and 38 also support above the inductance coil 39 and parallel therewith, a flat sided metal bar 40 carrying a metal slider 41 from which a contact arm 42 extends downwardly to engage the winding of the inductance coil 39, and from which an arm 43 extends upwardly and forwardly, to project through the slot 44 in the scale 13 to carry an indicating pointer 45 in front of and adjacent the indications of said scale.

The post 26 extends through the panel 23 as indicated, and is connected by wire 46 with one of the switch contacts co-operating with the switch blade 33, and the lower terminal of the primary winding 24 extends through the panel 23 and is connected by wire 47 with one of the switch contacts associated with the switch blade 34.

The panel 12 carries back of the binding post 5 the secondary winding 48 of a high frequency Tesla transformer, one terminal of which winding is connected by wire 49 with the binding post 5, the other terminal of said winding being connected by wire 50 with binding post 6 of the patient's circuit. The secondary winding 48 is surrounded by a primary winding 51, the terminals of which are connected by wires 52 and 53 with binding posts 3 and 4 of the patient's circuit.

The slider 41 is connected by a flexible wire 54 with a connector clip 55 supported in stationary position by the cabinet, this clip being connected by wire 56 with one of the switch contacts co-operating with the switch blade 33. The other terminal of the inductance coil 39 is connected by wire 57 with one of the switch contacts co-operating with the switch blade 34, and the other switch contacts co-operating with the switch blades 33 and 34 respectively are connected by wires 58 and 59 with binding posts 4 and 3 respectively of the patient's circuit.

Bars of insulating material 60 and 61, for example lava, constituting the insulating supports of the spark gap construction, are mounted on the panel 15 and behind it in the position indicated, and from the spark gap construction, wires 62 and 63 extend to the high potential terminals 64 and 65 respectively of the secondary winding of the step-up transformer 66 located in the lower part of the cabinet 10. The terminals 64 and 65 are also connected by wires 67 and 68 with terminals of the condenser 69. The remaining terminals of the condenser 69 are connected by wires 70 and 71 with the yokes 35 and 36 respectively.

The panel 15 carries on a rod extending from the knob 17, and back of the panel, a switch blade 72 co-operating with switch contacts 73, to vary the voltage of alternating current supplied to the high frequency producing devices. Current is supplied to the line switch 16 by main alternating current conductors 74, and the voltage delivered to the primary winding terminals 75 and 76 of the transformer 66 through wires 77 and 78, is conveniently varied by means of an auto-transformer 79 located in the lower part of the cabinet 10 and controlled by the switch blade 72. The circuit connections between the line switch 16, the switch blade 72, the switch contacts 73, the primary terminals 75 and 76 and the auto-transformers 79, are conveniently grouped in a cable 80.

Figure 4:
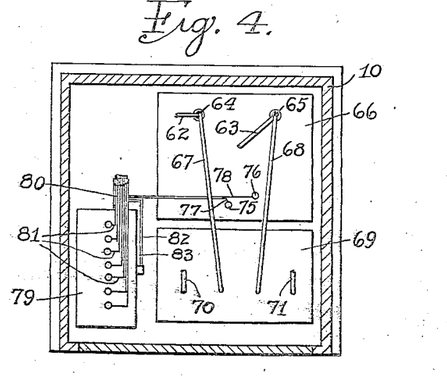
Fig. 4 is a sectional view of the parts shown in Fig. 3 taken along the line 4—4.
Figure 5:
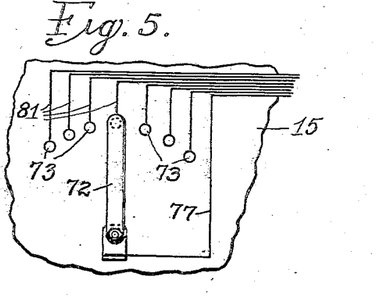
Fig. 5 is a sectional view of some of the parts shown in Fig. 3 taken along the line 5—5.

The relation of the transformer 66 and the condenser 69 to each other, and the circuit connections extending from these devices, are more clearly shown in Fig. 4. As shown in this figure, wires 81 extend from taps of the auto-transformer 79 through the cable 80 to the switch contacts 73 as more clearly shown in Fig. 5, the switch blade 72 being connected with the wire 77 extending to the primary terminal 75 of the transformer 66. The cable 80 also contains wires 82 and 83 extending to the terminals of the winding of the auto-transformer 79, from the line switch 16.

Figure 6:
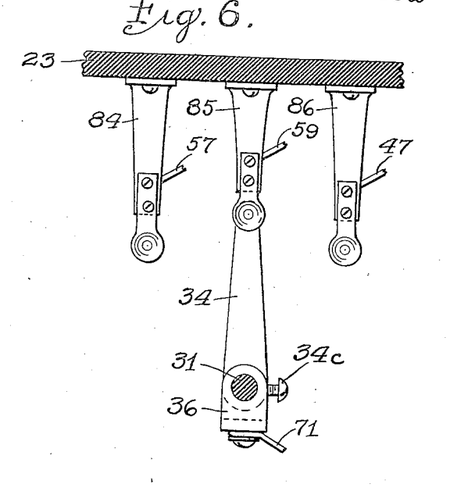
Fig. 6 is a sectional view of some of the parts shown in Fig. 3 taken along the line 6—6.
Figure 7:
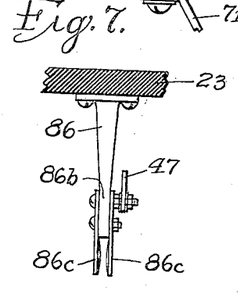
Fig. 7 is a rear elevation of one of the switch contacts shown in Fig. 6.
Figure 8:
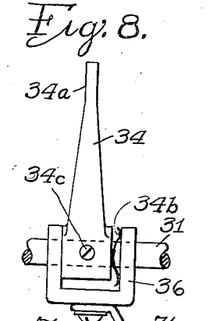
Fig. 8 shows in rear elevation the switch blade shown in Fig. 6.

As shown in Fig. 6, the switch blade 34 may by operation of the shaft 31, selectively engage any one of the switch contacts 84, 85 and 86 mounted on the panel 23, which contacts are connected with wires 57, 59 and 47 respectively. Each of the switch contacts, as shown for the switch contact 86 in Fig. 7, comprises a metal post extending downwardly from a flanged base, which post at its lower end, is flattened as indicated at 86ᵇ, and has secured to its opposite sides, switch jaws 86ᶜ of spring metal to make positive contact with the flattened upper end 34ᵃ of the switch blade 34 shown in Fig. 8. The lengths and separation of the switch contacts and the length of the switch blade, are such as to insure ample separation between the switch contacts in view of the high voltages employed. As shown in Fig. 8, the switch blade 34 is secured to the shaft 31 by means of a set screw 34ᶜ. The other switch blade 33 is of the same construction as the switch blade 34 and similarly carried by the shaft 31, and engages similar switch contacts 84ᵃ, 85ᵃ and 86ᵃ, which are therefore not shown in detail.

Figure 9:
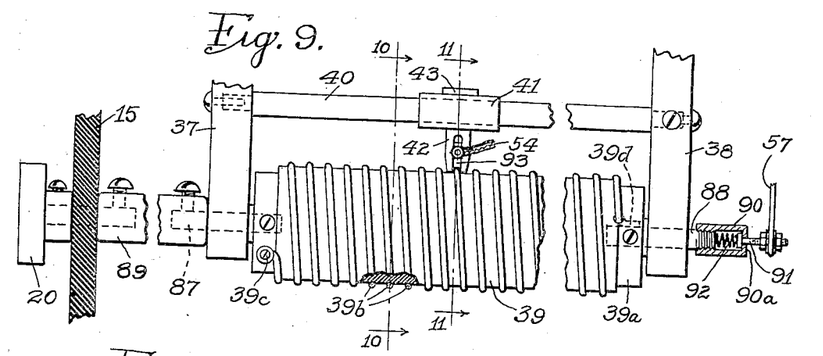
Fig. 9 is a sectional view to an enlarged scale of a part of the construction shown in Fig. 2, and shows in rear elevation the variable inductance coil employed, this view being taken along the line 9—9 in Fig. 2.

As shown in Fig. 9, the inductance coil 39 comprises a cylindrical core 39ᵃ of insulating material upon the surface of which the winding 39ᵇ of the coil is wound with its turns spaced from each other in a shallow helical groove in the outer surface of the core. The core has extending from its ends, metal shafts 87 and 88, which are secured to the core by set screws as indicated and extend respectively through the posts 37 and 38 to support the coil 39 for rotary movement. The shaft 87 is in line with the axis of the shaft extending through the panel 15 from the knob 20, and these two shafts are connected by a rod or sleeve 89 of insulating material by set screws as indicated. The shaft 88 carries on its outer end a sleeve 90 through the apertured end wall 90$^a$ of which a contact stud 91 extends, said stud being headed on its inner end and held in firm electrical contact with the end wall of the sleeve 90, by a spring 92, to permit rotation of the sleeve with the inductance coil 39, without rotation of the contact stud 91. The stud 91 is threaded on its outer end and carries suitable threaded nuts to permit making electrical connection with the stud. The winding 39$^b$ is secured at one end to the core 39$^a$ in any convenient manner, for example by a screw 39$^c$ as indicated, and the other end of the winding is extended through the core into electrical contact with the shaft 88 as indicated at 39$^d$.

Figure 10:
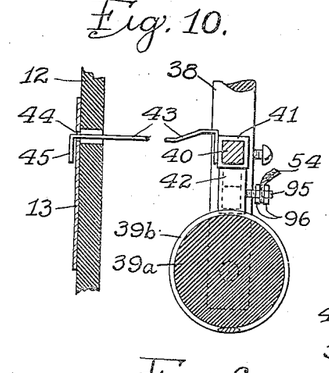
Fig. 10 is a sectional view of the construction shown in Fig. 9 taken along the line 10—10.
Figure 11:
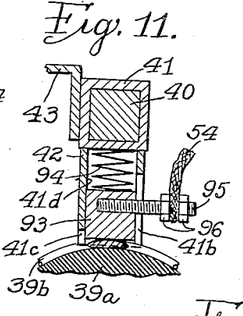
Fig. 11 is a sectional view to an enlarged scale of part of the construction shown in Fig. 9 taken along the line 11—11.

The slider 41, as more clearly shown in Figs. 10 and 11, comprises a tubular body portion of the conformation of the flat sided bar 40, and a sliding fit thereon, and a contact arm 42 extending downwardly from the tubular portion to contain a contact block 93, the lower end of which rests upon the winding 39$^b$ at any point of the winding at which the slider may be. The arm 42 is slotted in its front and rear walls as indicated at 41$^b$ and 41$^c$ to just clear the wire of the winding 39$^b$ and the contact block 93 is a sliding fit in a flat sided bore 41$^d$ in the said bore. A spring 94 is contained in the bore 41$^d$ to press the contact block 93 against the winding 39$^b$. The slot 41$^b$ extends upwardly to a sufficient extent so that a threaded post 95 carried by the contact block 93 may extend through said slot, the outer threaded end of the post having thereon threaded nuts 96 to facilitate making electrical connection with the contact block 93.

Figure 12:
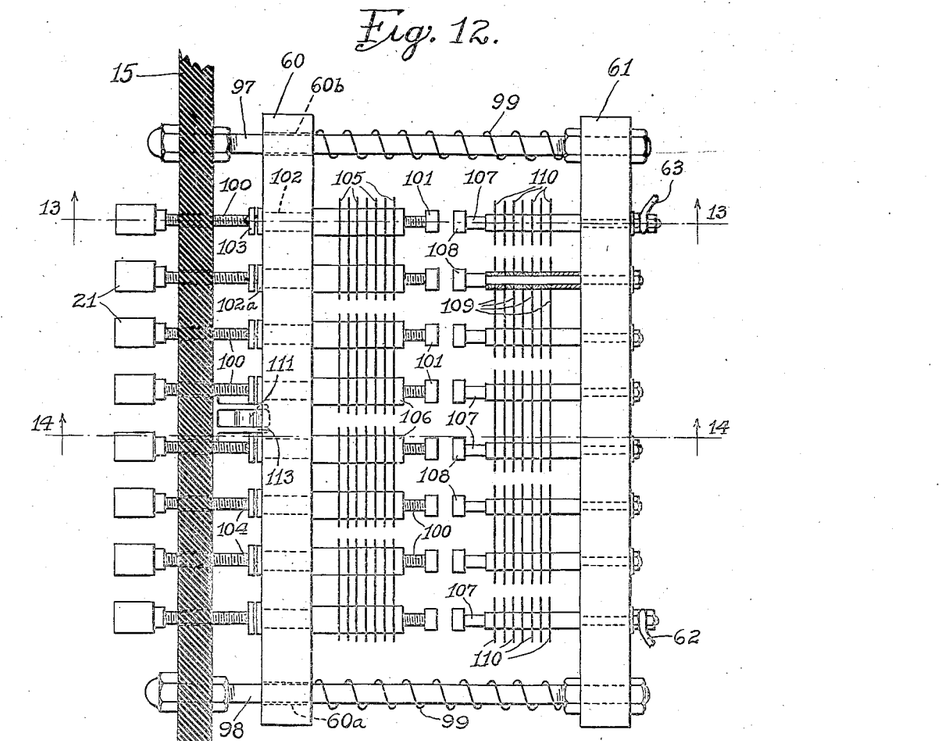
Fig. 12 is a sectional view to an enlarged scale of part of the construction shown in Fig. 3 taken along the line 12—12, and shows a top view of the spark gap construction employed.

As shown in Fig. 12, the spark gap bar 61 is rigidly mounted on rods 97 and 98 from the panel 15 in substantially horizontal position by means of nuts threaded on said rods as indicated. The bar 60 is provided with clearance holes 60$^a$ and 60$^b$, through which the rods 98 and 97 extend, so that the bar 60 may slide upon said rods. Springs 99 are mounted on the rods 97 and 98 between the bars 60 and 61 to tend to maintain the bars in separated relation from each other. The bar 60 carries a plurality of metal rods 100, extending through clearance openings therefor through the panel 15 and carrying at their outer ends the adjusting knobs 21. The inner ends of said rods are provided with gap electrodes of refractory material 101, for example tungsten. As more clearly shown in Fig. 13, each of the rods 100 is threaded its entire length and engages corresponding internal threads in a metal sleeve 102, rigidly mounted in the bar 60, the threaded end of the sleeve projecting from the bar 60 towards the bar 61 and terminating adjacent the electrode 101. The other end of the sleeve 102 is flanged outwardly as indicated at 102$^a$, and adjacent this flange, the rod 100 carries a threaded disk 103 engaging the threads of the rod, which disk is secured to the flange 102$^a$ by a screw 104 in such a manner that tightening or loosening the screw increases or decreases the friction upon the screw threads of the rod 100 and thus provides a convenient means for securing any desired degree of tightness of the co-operating threads and any desired adjustment of the turning effort required to rotate the rod. The projecting end of the sleeve 102 has mounted thereon a plurality of thin metal plates 105 which are preferably of high heat conductivity, for example copper, which plates are held in place by washers as indicated and a nut 106 threaded on the end of the sleeve 102. As indicated in Fig. 12 the plates 105 are secured in the manner described to the sleeves of two adjacent rods 100, and in this manner the rods 100 indicated as connected by these plates are electrically connected together. The bar 61 carries a plurality of rods 107 similar to the rods 100 except that they are rigidly supported in fixed position by the bar 61 to extend towards the rods 100 and on their ends adjacent the electrodes 101, these rods 107 carry gap electrodes 108. The rods 107 are connected by radiating plates 109 similar to the plates 105, the difference being that each connected pair of rods 107 carries electrodes co-operating with one electrode of each of two connected pairs of the rods 100 so that the electrical connections effected by the plates 105 and 109 serve to connect the individual spark gaps between the electrodes 101 and 108, in series arrangement. The end rods 107 are provided with radiating plates 110 which are individual to these rods and are therefore of smaller extent than the radiating plates 109, since these end rods 107 are not electrically connected with any of the other rods of the spark gap construction. The end rods 107 carry suitable threaded nuts adjacent the bar 61 to connect the wires 62 and 63 to the said end rods.

Figures 13, 14:
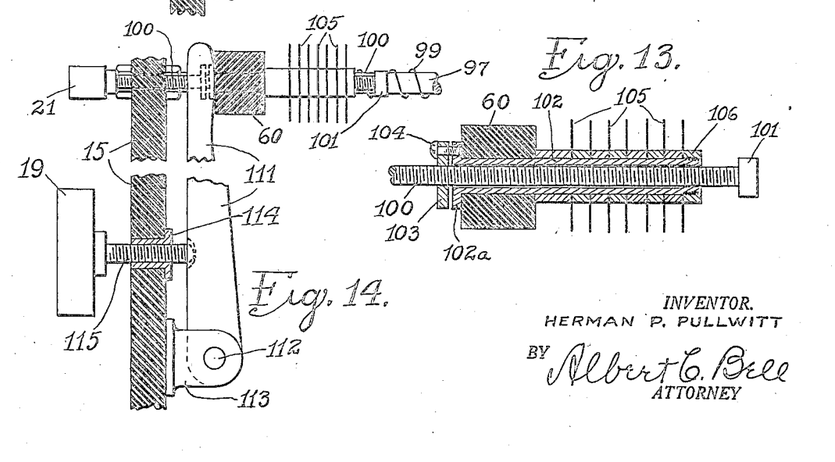
Fig. 13 is a sectional view of a part of the construction shown in Fig. 12 taken along the line 13—13.
Fig. 14 is a sectional view of the construction shown in Fig. 12 taken along the line 14—14.

As more clearly shown in Fig. 14, an operating lever 111 is pivotally mounted at its lower end as indicated at 112, on a bracket 113 supported by the panel 15 below the knob 19. A threaded metal bushing 114 is inserted in the panel 15 co-axially with the axis of the knob 19, and a threaded rod 115 carried by the knob 19 engages internal threads in the bushing 114 and extends through the bushing to engage the lever 111, so that turning the knob 19 moves the lever away from the panel 15 or permits it to move towards the panel 15, according to the direction of rotation of the knob 19. The upper end of the lever 111 extends between two of the rods 100 and engages the midportion of the front face of the bar 60 in a manner to prevent the springs 99 from moving the bar 60 towards the panel 15 further than the position of the lever 111 will permit.

As a result of the construction just described, it will appear that each of the individual gaps of the spark gap may be adjusted by turning the corresponding one of the knobs 21 and that when all of the individual spark gaps are in desired adjustment, turning the knob 19 will move all of the spark gap electrodes 101 substantially equal amounts towards or away from the electrodes 108, and thus afford a convenient means for quickly securing any length of spark gap desired.

Figure 15:
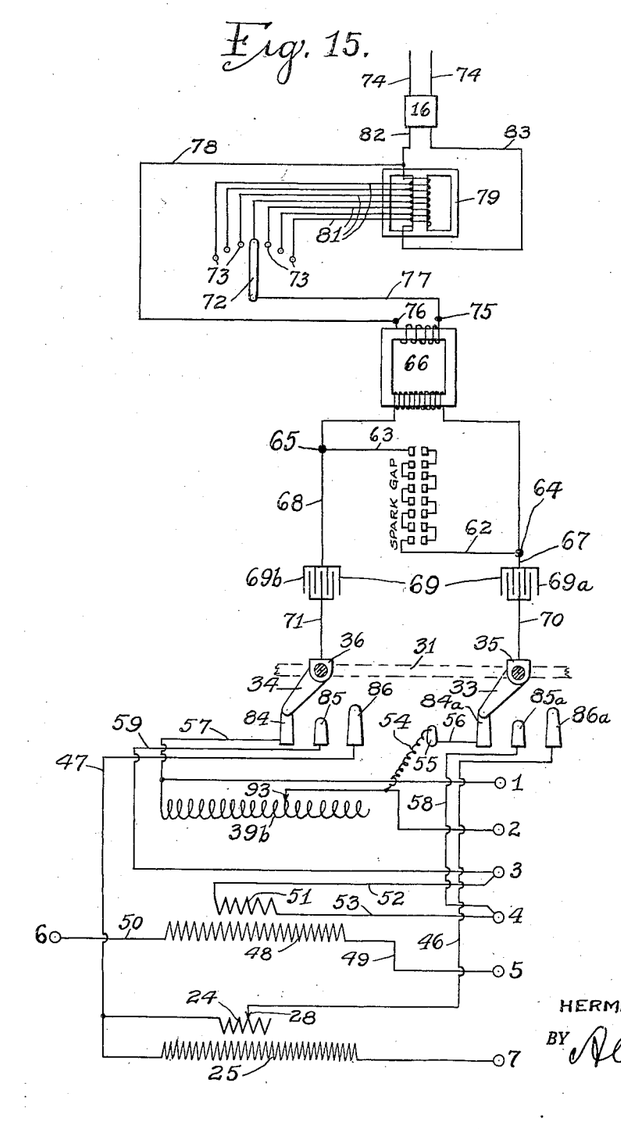
Fig. 15 is a diagrammatic drawing of the circuit connections of my machine.

In Fig. 15 I show diagrammatically, the circuit connections of the machine as a whole, and it is thought that in view of the description above given of the connection of the various wires to the different parts of the apparatus, further description of the circuits is not needed. As shown in Fig. 15, the condenser 69 consists of two sections 69$^a$ and 69$^b$, connected in series respectively with the wires 67 and 70, and the wires 68 and 71, extending from the high voltage secondary winding of the transformer 66, to the modality switch blades 33 and 34.

From the circuit connections shown in Fig. 15 it will at once appear that with the switch blades 33 and 34 in the position indicated, the spark gap, the condenser sections and the accurately adjustable inductance 39 provide a means for accurately producing and delivering high frequency current to the patient's posts 1 and 2 of any particular frequency desired within the range of frequencies of the apparatus, and further that the spark gap construction may readily be adjusted so that it will most effectively set up high frequency current flow in the oscillatory circuit just referred to.

Figure 16:
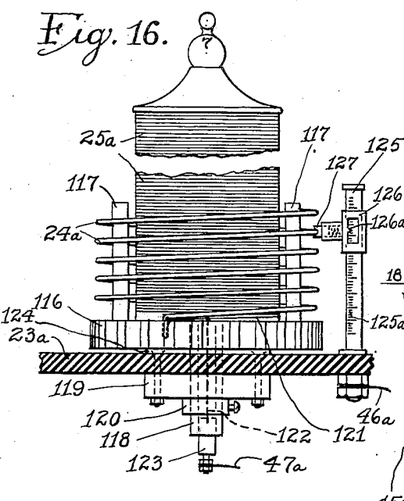
Fig. 16 shows in front elevation, a modified form of Oudin resonator by which the inductance of the primary winding may be varied in substantially the manner indicated for the inductance coil shown in Fig. 9.

In some cases I find it desirable to provide the Oudin resonator with devices for continuously changing the inductance of the coil connected with and forming a part of the oscillatory circuit, so that the changes are of infinitely small amount throughout the entire range of inductance of the winding, instead of using the coarse step adjustment secured by the conventional devices shown in Figs. 1 and 2. To accomplish this, as illustrated in Fig. 16, the primary and secondary windings 24$^a$ and 25$^a$ of the resonator, may be mounted on a rotary base 116, preferably of insulating material, the primary winding 24$^a$ being supported around the secondary winding 25$^a$ in concentric relation by posts 117 carried by the base 116, and the convolutions of the primary winding being so supported that contact may be made continuously with the outer surface of the winding from one of its ends to the other. The base 116 is provided with a downwardly extending central tube 118, preferably of insulating material, which extends through the panel 23$^a$ and through a bearing block 119 secured to the under surface of the panel. The tube 118 projects below the block 119 and carries a collar 120 to hold the base 116 in place. The lower ends of the primary winding 24$^a$ and the secondary winding 25$^a$ are connected by a wire 121 and this connecting wire has connected with it a second wire 122 extending through the tube 118 to a contact terminal 123 of a construction similar to that described above for the terminal 90 in connection with Fig. 9. A washer 124, preferably of insulating material, is carried by the panel 23$^a$ around the tube 118, to reduce the turning friction of the rotary base 116. The panel 23$^a$ carries a metal post 125 at one side of the base 116, which post is preferably flat sided and carries a slider 126 having a similar shaped bore, so that the slider may move vertically on the post 125, but be prevented from turning on the post. The slider carries a contact 127 of the plunger type, in engagement with the outer surface of the wire of the primary winding 24$^a$, said slider and contact being constructed similarly to the slider 41 and its contact 93, shown and described in connection with Figs. 9 and 11 above, the principal difference being that the outer end of the contact 127 is grooved so that the contact has sufficient lateral engagement with the wire of the primary winding 24$^a$, to move the slider 126 vertically on the post 125, when the base 116 is rotated. The post may conveniently carry a scale 125$^a$, and the corresponding wall of the slider 126 may be apertured and provided with a pointer 126$^a$ for indicating in any desired units, the frequency of the current flow resulting from any particular adjustment of the base 116.

The connector 123 and the post 125 are connected with wires 47$^a$ and 46$^a$, which may be connected in the same manner as above described for the wires 47 and 46 respectively, with the remaining parts of the apparatus diagrammatically illustrated in Fig. 15.

To facilitate rotation of the base 116 I prefer to flute its outer edge, or otherwise provide it with convenient means for engagement by the hand of the operator.

Figure 17:
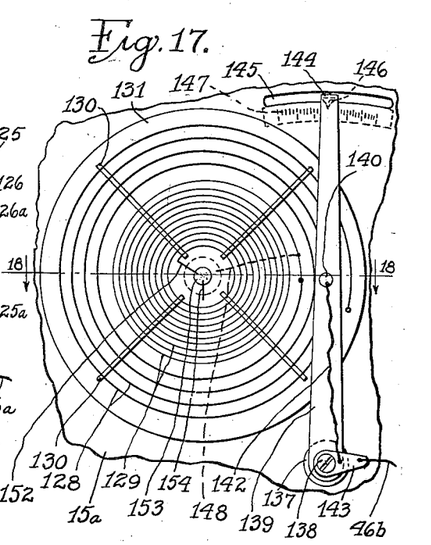
Fig. 17 shows in rear elevation, a modified form of inductance coil of the pan-cake type as distinguished from the helical form of coils shown in Figs. 9 and 16, together with devices for continuously varying the inductance by infinitely small amounts throughout the entire inductance range of the coil.
Figure 18:
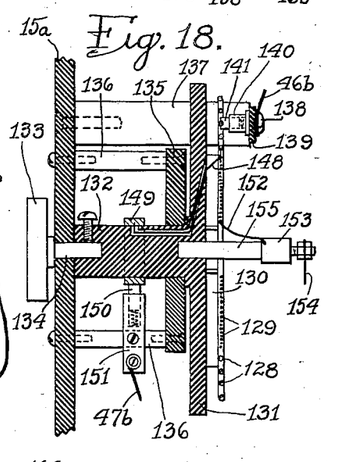
Fig. 18 is a sectional view of the parts shown in Fig. 17 taken along the line 18—18.

In Fig. 17 I show in elevation, an inductance coil of the flat or pan-cake type for use where the type of coil shown in Figs. 9 and 16 is not preferred. In this construction, a primary winding, spiral in form is shown at 128, and similarly wound within the primary winding and substantially in the same plane, a secondary winding is shown at 129. The windings 128 and 129 may be conveniently supported in the position shown, by bars 130 of insulating material carried by a disk 131 also preferably of insulating material. As shown in Fig. 18, the disk 131 is provided with a cylindrical shaft portion 132 extending away from the windings 128 and 129, towards a supporting panel 15ᵃ. An adjusting knob 133 rigidly carries a rod 134 extending through the panel 15ᵃ and into the end of the shaft portion 132 to which it is rigidly secured by a set screw as indicated. The other end of the shaft portion 132, is supported by a bearing disk 135, held in place by posts 136 supported by the panel 15ᵃ. The construction described supports the windings 128 and 129 so they may be rotated about the axis of the shaft portion 132, by turning the knob 133.

The panel 15ᵃ also supports another post 137, preferably of insulating material, which extends rearwardly beyond the disk 131, to carry the pivotal support 138 of a swinging arm 139, preferably of insulating material, said arm being mounted to swing in a plane substantially parallel with the windings 128 and 129. The arm 139 carries a metal contact housing 140 substantially in line with the horizontal diameter of the windings 128 and 129, and this housing 140 carries a plunger contact 141 having a grooved end engaging the wire of the primary winding 128, depending upon where the arm happens to be relatively to the winding. The contact 141 is preferably cylindrical and may turn in its housing 140 and thus, when the disk 131 is rotated, the contact 141 remains continuously in contact with the wire of the winding 128 from one end to the other of said winding, and the part of the winding connected in an oscillatory circuit may be varied as desired by infinitely small amounts throughout the entire inductance range of the coil. The contact housing 140 is preferably connected by a flexible wire 142 with a connector clip 143, held in place by the arm supporting pivot 138, and the clip 143 may also have connected with it one terminal wire of the device as indicated at 46ᵇ.

The arm 139 may be extended beyond the contact housing 140 and carry at its upper end an arm 144 extending horizontally towards the panel 15ᵃ and through a slot 145 in said panel, to carry on its outer end a pointer 146 co-operating with a scale 147 indicating in any desired units, the frequency of the current in the oscillatory circuit of which the winding 128 is a part, for any adjustment of the winding relatively to the contact 141.

The adjacent ends of the windings 128 and 129 may be connected together as indicated, and this connection may be connected by wire 148 with a metal contact or slip ring 149 carried by the shaft portion 132. The contact ring 149 is engaged by a plunger contact 150 carried by a contact housing 151 supported by one of the posts 136, and the other terminal wire 47ᵇ of the device, may be connected with the contact housing 151 in any convenient manner as indicated.

The inner end of the secondary winding 129 may be connected by wire 152 with a contact terminal 153 of the type shown for the contact terminal 90 in Fig. 9 above, and a wire 154 may extend from the contact terminal 153 to connect one terminal of the secondary winding 129 in circuit as desired. The contact terminal 153 may conveniently be supported by a post 155, preferably of insulating material extending co-axially and rearwardly from the disk 131 which carries it.

Where the device shown in Figs. 17 and 18 is constructed for use as a resonator, the wires 46ᵇ and 47ᵇ may be connected with the remaining parts of the apparatus shown diagrammatically in Fig. 15 in the same manner that the windings 24 and 25 are shown as connected with said remaining parts by the wires 46 and 47 in said figure, and in that case the wire 154 extends to a high tension terminal of the patient's circuit corresponding with the terminal 7 shown in Fig. 15.

Figure 19:
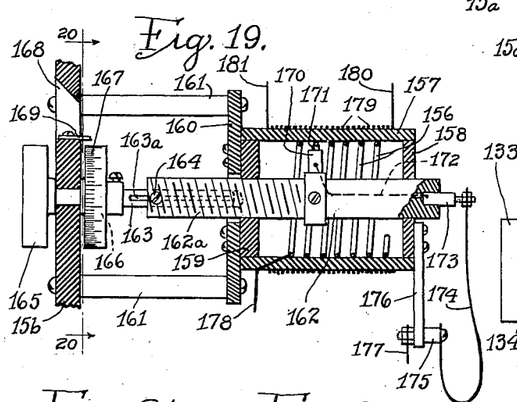
Fig. 19 is a longitudinal, sectional view through a modified form of helical inductance coil having a support surrounding the coil, together with devices for continuously varying the inductance of the coil by infinitely small amounts throughout the entire inductance range of the coil.

In Fig. 19, I illustrate a further modified form of variable inductance, in which the inductance may be changed by continuous and infinitely small amounts throughout the entire range of inductance of the coil, which may readily be used as a d'Arsonval type of coil, as an Oudin resonator transformer or as a Tesla transformer as desired, depending upon whether a secondary winding is employed with the variable inductance winding, and if it is employed, the manner in which it is connected. In this construction, an inductance winding 156 is wound on the inner surface of a tube 157 of insulating material, which tube is provided with end disks 158 and 159 of insulating material, the disk 159 being secured to a supporting disk 160, preferably of insulating material, supported substantially parallel with a panel 15ᵇ by posts 161, preferably of insulating material, and carried by the panel, so that the axis of the tube 157 is substantially perpendicular with the panel 15ᵇ. The end disk 159 of the tube 157, is bored and threaded to engage corresponding threads 162ᵃ on a shaft 162 of insulating material, co-axially mounted in the tube 157 and extending with a sliding fit through the end disk 158. The threaded end of the shaft 162 is bored to receive the end portion of an operating shaft 163, the latter shaft being provided with a keyway 163ᵃ engaged by the end of a screw 164 carried by the threaded end of the shaft 162, in a manner to prevent relative rotation between the shafts 162 and 163, but at the same time permitting the shaft 162 to move axially relatively to the shaft 163. The shaft 163 extends through the panel 15ᵇ and has rigidly secured to its outer end, an operating knob 165. Inside of the panel 15ᵇ, the shaft 163 also has rigidly secured to it, a wheel 166 carrying a scale of flexible material 167, visible to the operator, through a sight opening 168 in the panel 15ᵇ, the particular adjustment of the device being indicated on the scale 167 at any instant by the pointer 169.

The shaft 162 is provided inside of the winding 156, with a contact housing 170, extending radially from the shaft 162 towards the winding 156. The housing 170 carries a plunger contact 171 engaging the inner surface of the wire of the winding 156, and the pitch of the threads 162ᵃ of the shaft 162 is the same as the pitch of the turns of the winding 156, as a result of which, turning the shaft 162 maintains the contact 171 in engagement at all times with the inner surface of the winding 156, and at a point at any time, determined by the axial and angular positions of the shaft 162 resulting from its rotation. The contact housing 170 may be conveniently carried by the shaft 162 in any desired manner and is connected by a wire 172 with a contact terminal 173 carried by the end of the shaft 162 and of the same type shown and described for the contact terminal 90 in connection with Fig. 9 above. The contact terminal 173 may conveniently be connected with a flexible wire 174, the other end of which extends to a terminal post 175 carried by an arm 176 of insulating material extending from the end disk 158, and the contact terminal 175 may be connected with one of the terminal wires 177 of the device. The end of the winding 156 adjacent the supporting disk 160, may conveniently extend to the other terminal wire 178 of the inductance coil, and when the coil is used as a plain inductance winding of the d'Arsonval type, the terminal wires 177 and 178 may be connected with the rest of the apparatus illustrated diagrammatically in Fig. 15 by connecting the wires 177 and 178 in the same manner that the wires 56 and 57 are shown as connected in Fig. 15, in which case the winding 156 would replace the inductance winding 39ᵇ of Fig. 15.

If desired, the device shown in Fig. 19 may be provided with a secondary winding 179 wound on the outer surface of the tube 157, or wound in a manner to surround the tube, so that it is inductively related to the winding 156, which winding then constitutes the primary winding of a transformer of the Tesla type. With this construction, in using the device instead of the Tesla coil above described, in connection with the rest of the apparatus shown diagrammatically in Fig. 15, the terminal wires 180 and 181 of the secondary winding 179, are connected in the manner shown and described above for the wires 49 and 50 and the terminal wires 177 and 178 are connected as shown and described above for the wires 52 and 53.

Where the device shown in Fig. 19 is used as an Oudin resonator, in connection with the other apparatus shown diagrammatically in Fig. 15, the wires 178 and 181 are connected with the switch contact 86 in the manner shown for the wire 47, the wire 177 is connected in the manner shown for the wire 46, and the wire 180 extends to a terminal of the patient's circuit as illustrated at 7 in Fig. 15.

Figure 20:
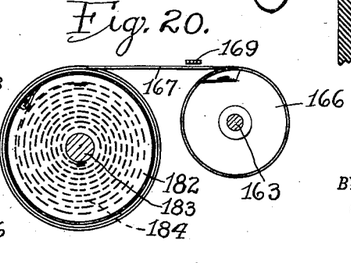
Fig. 20 is a sectional view of part of the construction shown in Fig. 19 taken along the line 20—20.

As shown in Fig. 20, the flexible scale 167 extends from the wheel 166 to a drum 182 mounted for rotary movement on a stationary stud 183 carried by the panel 15ᵇ, in substantially the plane of the wheel 166. The drum 182 contains a spring 184, the ends of which are connected respectively with the stud 183 and the drum 182, said spring tending at all times to wind the flexible scale 167 upon the drum 182 with just sufficient tension to maintain the scale in flat and straight condition as it passes under the pointer 169. The scale 167 affords a convenient means for indicating at any instant in any desired units, the frequency of the alternating current flow in the oscillatory circuit of which the winding 156 may be a part, depending upon the position at that instant of the contact 171, and it will further be observed that the inductance may be changed continuously and by infinitely small amounts throughout the entire inductance range of the coil 156 and that the same is true whether a secondary winding is used with the winding 156 or not, possible differences in inductance effect due to the secondary winding being compensated for by suitably calibrating the flexible scale 167.

It is obvious that the inductance devices shown and described may be connected in any desired manner, depending upon the other apparatus used and the result to be secured.

Figure 21:
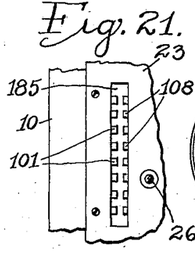
Fig. 21 shows in plan view a part of the side edge portion of the top of the casing shown in Figs. 1 and 2.

In Fig. 21 I show a portion of the top of the casing 10 and panel 23 over the spark gap of the apparatus as a whole, to illustrate the slot 185 preferably formed through the panel 23 to permit the operator to see the spark gap electrodes 101 and 108 and determine when the electrodes are properly adjusted both individually and collectively.

From the above it will appear, where it is desirable in an oscillatory circuit to secure exact adjustment of the frequency of the current flowing in the circuit and to secure a resonant condition of the circuit for any particular frequency within the range of the apparatus, that my variable inductance coil lends itself admirably to the purpose, particularly where the voltages are high, that the inductance changes permitted by my construction, are continuous throughout the entire inductance range of the coil, that coarse steps in the adjustment are eliminated entirely, and that the change in inductance is made smoothly and by infinitesimal amounts throughout the entire inductance range of the coil. It will also appear that my invention is applicable to any type of inductance winding and I do not therefore limit myself in carrying out my invention, to any particular type of inductance winding or coil.

My variable inductance coil is particularly adapted for use in any connection where it is required to change the frequency of current flow over a wide range of frequencies, and where high voltages are involved. For example, with the apparatus above described, the step-up transformer 66 may for the purpose contemplated, have its primary winding supplied with energizing current at 110 volts and with a frequency of 60 cycles per second, common in lighting circuits generally, and its secondary winding may deliver a maximum voltage of 25000 volts at the same frequency. The action of the spark gap, the condenser and the inductance coil connected with the secondary winding of the transformer 66, produces a high frequency current flow through the oscillatory circuit formed by these devices, which may range for example from 750 to 2200 kilocycles per second, depending upon the amount of capacity and inductance contained in the oscillatory circuit, in accordance with well known formulæ for high frequency flow, and the voltage of the current in the inductance winding may be substantially the same as the voltage of the current delivered by the secondary winding of the transformer 66, or somewhat higher, depending upon the apparatus employed. When the high frequency current is supplied to the Tesla transformer, a maximum voltage of, for example, 35000 volts may be generated by the secondary winding of that transformer, and when the Oudin resonator is similarly employed, its secondary winding may develop a voltage as high as 75000 volts. The voltages delivered by the several transformers as above referred to may, of course, be less than the maximum values stated, by decreasing the voltage impressed upon the primary winding of the transformer 66, by operation of the switch 72 to impress on the primary winding but part of the voltage drop across the terminals of the auto-transformer 79. The particular values stated, are given as illustrative only, to emphasize that the apparatus employed is subject to practical limitations to withstand these high voltages, and that many types of variable inductances and variable condensers which are used for tuning high frequency circuits of negligible voltage, for example, one or two volts or less, cannot be used at all for the purpose contemplated by the present invention, since their size would be prohibitive if their windings and parts were sufficiently spaced and insulated to withstand high voltages of the kind under consideration.

While I have shown my invention in the particular embodiments above described, it will be understood that I do not limit myself to these exact constructions as I may employ equivalents known to the art at the time of the filing of this application without departing from the scope of the appended claims.

What I claim is:

1. In an electro-therapeutic machine for producing high frequency electric currents, the combination of a source of high potential alternating current, a spark gap connected across the terminals of said source, a condenser connected with said terminals, and an inductance connected with said terminals to form with said spark gap and said condenser an oscillatory circuit, said inductance comprising a rotary core of insulating material, bearings supporting said core for rotation, a bare winding helically wound on said core with its turns separated from each other, a guide bar supported substantially parallel with said core, a slider on said guide bar, and an electric contact member carried by said slider and engaging said winding, said slider having lateral engagement with said winding moving said slider longitudinally of said guide bar by rotation of said core.

2. In an electro-therapeutic machine for producing high frequency electric currents, the combination of a source of high potential alternating current, a spark gap connected across the terminals of said source, a condenser connected with said terminals, and an inductance connected with said terminals to form with said spark gap and said condenser an oscillatory circuit, said inductance comprising a rotary core of insulating material, bearings supporting said core for rotation, a bare winding helically wound on said core with its turns separated from each other, a guide bar supported substantially parallel with said core, and electric contact mechanism carried by and movable longitudinally of said guide bar and engaging said winding, said contact mechanism having lateral engagement with said winding moving said mechanism longitudinally of said guide bar by rotation of said core.

3. In an electro-therapeutic machine for producing high frequency electric currents, the combination of a source of high potential alternating current, a spark gap connected across the terminals of said source, a condenser connected with said terminals, and an inductance connected with said terminals to form with said spark gap and said condenser an oscillatory circuit, said inductance comprising a rotary core of insulating material, bearings supporting said core for rotation, a bare winding helically wound on said core with its turns separated from each other, a guide bar supported substantially parallel with said core, and electric contact mechanism carried by and movable longitudinally of said guide bar and engaging said winding, said contact mechanism having lateral engagement with said winding moving said mechanism longitudinally of said guide bar by rotation of said core, said bearings comprising posts of insulating material supporting said guide bar.

4. In an electro-therapeutic machine for producing high frequency electric currents, the combination of a source of high potential alternating current, a spark gap connected across the terminals of said source, a condenser connected with said terminals, and an inductance connected with said terminals to form with said spark gap and said condenser an oscillatory circuit, said inductance comprising a rotary core of insulating material, bearings supporting said core for rotation, a bare winding helically wound on said core with its turns separated from each other, a guide bar supported substantially parallel with said core, a slider on said guide bar, an electric contact member carried by said slider and engaging said winding, said slider having lateral engagement with said winding moving said slider longitudinally of said guide bar by rotation of said core, a pointer carried by said slider, and a scale cooperating with said pointer and indicating the frequency of the alternating current in said oscillatory circuit for any position of said core.

5. In an electro-therapeutic machine for producing high frequency electric currents, the combination of a source of high potential alternating current, a spark gap connected across the terminals of said source, a condenser connected with said terminals, and an inductance connected with said terminals to form with said spark gap and said condenser an oscillatory circuit, said inductance comprising a rotary core of insulating material, bearings supporting said core for rotation, a bare winding helically wound on said core with its turns separated from each other, a guide bar supported substantially parallel with said core, electric contact mechanism carried by and movable longitudinally of said guide bar and engaging said winding, said contact mechanism having lateral engagement with said winding moving said mechanism longitudinally of said guide bar by rotation of said core, a pointer carried by said contact mechanism, and a scale cooperating with said pointer and indicating the frequency of the alternating current in said oscillatory circuit for any position of said core.

6. In an electro-therapeutic machine for producing high frequency electric currents, the combination of a source of high potential alternating current, a spark gap connected across the terminals of said source, a condenser connected with said terminals, an inductance connected with said terminals to form with said spark gap and said condenser an oscillatory circuit, said inductance comprising a rotary core of insulating material, bearings supporting said core for rotation, a bare winding helically wound on said core with its turns separated from each other, a guide bar supported substantially parallel with said core, a slider on said guide bar, and an electric contact member carried by said slider and engaging said winding, said slider having lateral engagement with said winding moving said slider longitudinally of said guide bar by rotation of said core, and supply terminals of a patient's circuit connected with one end of said winding and with said contact member.

7. In an electro-therapeutic machine for producing high frequency electric currents, the combination of a source of high potential alternating current, a spark gap connected across the terminals of said source, a condenser connected with said terminals, an inductance connected with said terminals to form with said spark gap and said condenser an oscillatory circuit, said inductance comprising a rotary core of insulating material, bearings supporting said core for rotation, a bare winding helically wound on said core with its turns separated from each other, a guide bar supported substantially parallel with said core, and electric contact mechanism carried by and movable longitudinally of said guide bar and engaging said winding, said contact mechanism having lateral engagement with said winding moving said mechanism longitudinally of said guide bar by rotation of said core, and supply terminals of a patient's circuit connected with one end of said winding and with said contact mechanism.

8. In an electro-therapeutic machine, the combination of a source of alternating current, a spark gap, a condenser, and an inductance connected to constitute an oscillatory circuit, said inductance comprising a rotary core of insulating material, bearings supporting said core for rotation, a bare winding helically wound on said core with its turns separated from each other, a guide bar supported substantially parallel with said core, a slider on said guide bar, and an electric contact member carried by said slider and engaging said winding, said slider having lateral engagement with said winding moving said slider longitudinally of said guide bar by rotation of said core.

9. In an electro-therapeutic machine, the combination of a source of alternating current, a spark gap, a condenser, and an inductance connected to constitute an oscillatory circuit, said inductance comprising a rotary core of insulating material, bearings supporting said core for rotation, a bare winding helically wound on said core with its turns separated from each other, a guide bar supported substantially parallel with said core, and electric contact mechanism carried by and movable longitudinally of said guide bar and engaging said winding, said contact mechanism having lateral engagement with said winding moving said mechanism longitudinally of said guide bar by rotation of said core.

10. In an electro-therapeutic machine, the combination of a source of alternating current, a spark gap, a condenser, and an inductance connected to constitute an oscillatory circuit, said inductance comprising a rotary core of insulating material, bearings supporting said core for rotation, a bare winding helically wound on said core with its turns separated from each other, a guide bar supported substantially parallel with said core, and electric contact mechanism carried by and movable longitudinally of said guide bar and engaging said winding, said contact mechanism having lateral engagement with said winding moving said mechanism longitudinally of said guide bar by rotation of said core, said bearings comprising posts of insulating material supporting said guide bar.

11. In an electro-therapeutic machine, the combination of a source of alternating current, a spark gap, a condenser, and an inductance connected to constitute an oscillatory circuit, said inductance comprising a rotary core of insulating material, bearings supporting said core for rotation, a bare winding helically wound on said core with its turns separated from each other, a guide bar supported substantially parallel with said core, electric contact mechanism carried by and movable longitudinally of said guide bar and engaging said winding, said contact mechanism having lateral engagement with said winding moving said mechanism longitudinally of said guide bar by rotation of said core, a pointer carried by said contact mechanism, and a scale cooperating with said pointer and indicating the frequency of the alternating current in said oscillatory circuit for any position of said core.

12. In an electro-therapeutic machine, the combination of a source of alternating current, a spark gap, a condenser, and an inductance connected to constitute an oscillatory circuit, said inductance comprising a rotary core of insulating material, bearings supporting said core for rotation, a bare winding helically wound on said core with its turns separated from each other, a guide bar supported substantially parallel with said core, and electric contact mechanism carried by and movable longitudinally of said guide bar and engaging said winding, said contact mechanism having lateral engagement with said winding moving said mechanism longitudinally of said guide bar by rotation of said core, and supply terminals of a patient's circuit connected with one end of said winding and with said contact mechanism.

13. In an electro-therapeutic machine, the combination of a spark gap, a condenser, and an inductance connected to constitute an oscillatory circuit, said inductance comprising a rotary core of insulating material, bearings supporting said core for rotation, a bare winding helically wound on said core with its turns separated from each other, and electric contact mechanism mounted for relative movement laterally of and engaging said winding, said contact mechanism having lateral engagement with said winding effecting relative movement of said mechanism laterally of said winding.

14. In an electro-therapeutic machine, the combination of a spark gap, a condenser, and an inductance connected to constitute an oscillatory circuit, said inductance comprising a rotary core of insulating material, bearings supporting said core for rotation, a bare winding helically wound on said core with its turns separated from each other, electric contact mechanism mounted for relative movement laterally of and engaging said winding, and indicating devices actuated by said relative lateral movement indicating the frequency of the current in said oscillatory circuit for any position of said contact mechanism on said winding.

15. In an electro-therapeutic machine, the combination of a spark gap, a condenser, and an inductance connected to constitute an oscillatory circuit, said inductance comprising a rotary core of insulating material, bearings supporting said core for rotation, a bare winding helically wound on said core with its turns separated from each other, electric contact mechanism mounted for relative movement laterally of and engaging said winding, a pointer actuated by said relative movement, and a scale cooperating with said pointer and showing the frequency of the current in said oscillatory circuit for any position of said contact mechanism on said winding.

16. In an electro-therapeutic machine, the combination of a spark gap, a condenser, and an inductance connected to constitute an oscillatory circuit, said inductance comprising a rotary core of insulating material, bearings supporting said core for rotation, a bare winding helically wound on said core with its turns separated from each other, electric contact mechanism mounted for relative movement laterally of and engaging said winding, and supply terminals of a patient's circuit connected with said winding and said contact mechanism.

17. In an electro-therapeutic machine, the combination of a spark-gap, a condenser, and an inductance connected to constitute an oscillatory circuit, said inductance comprising an inductive winding, electric contact mechanism engaging the conductor of said winding with sliding contact longitudinally of said conductor, and means supporting said winding and said contact mechanism for relative movement in a first direction and permitting relative movement between said winding and said contact mechanism in a second direction to maintain said contact mechanism in said sliding contact with said conductor.

18. In an electro-therapeutic machine, the combination of a spark-gap, a condenser, and an inductance connected to constitute an oscillatory circuit, said inductance comprising an inductive winding, electric contact mechanism engaging the conductor of said winding with sliding contact longitudinally of said conductor, means supporting said winding and said contact mechanism for relative movement in a first direction and permitting relative movement between said winding and said contact mechanism in a second direction to maintain said contact mechanism in said sliding contact with said conductor, and devices operated by said relative movements indicating in desired units the inductance effect of said inductive winding.

19. In an electro-therapeutic machine, the combination of a spark-gap, a condenser, and an inductance connected to constitute an oscillatory circuit, said inductance comprising an inductive winding, electric contact mechanism engaging the conductor of said winding with sliding contact longitudinally of said conductor, and means supporting said winding and said contact mechanism for relative movement in a first direction and permitting relative movement between said winding and said contact mechanism in a second direction to maintain said contact mechanism in said sliding contact with said conductor, and terminals of a patient's circuit connected with said oscillatory circuit.

20. In an electro-therapeutic machine, the combination of a spark-gap, a condenser, and an inductance connected to constitute an oscillatory circuit, said inductance comprising an inductive winding, electric contact mechanism engaging the conductor of said winding with sliding contact longitudinally of said conductor, means supporting said winding and said contact mechanism for relative movement in a first direction and permitting relative movement between said winding and said contact mechanism in a second direction to maintain said contact mechanism in said sliding contact with said conductor, and devices operated by said relative movements indicating in desired units the inductance effect of said inductive winding, and terminals of a patient's circuit connected with said oscillatory circuit.

In witness whereof, I hereunto subscribe my name this 17th day of September, A. D. 1928.

HERMAN P. PULLWITT.